Sept. 19, 1961 B. B. FELTS 3,000,264
RETRACTABLE MIRROR FOR AUTOMOTIVE VEHICLES
Filed July 27, 1959
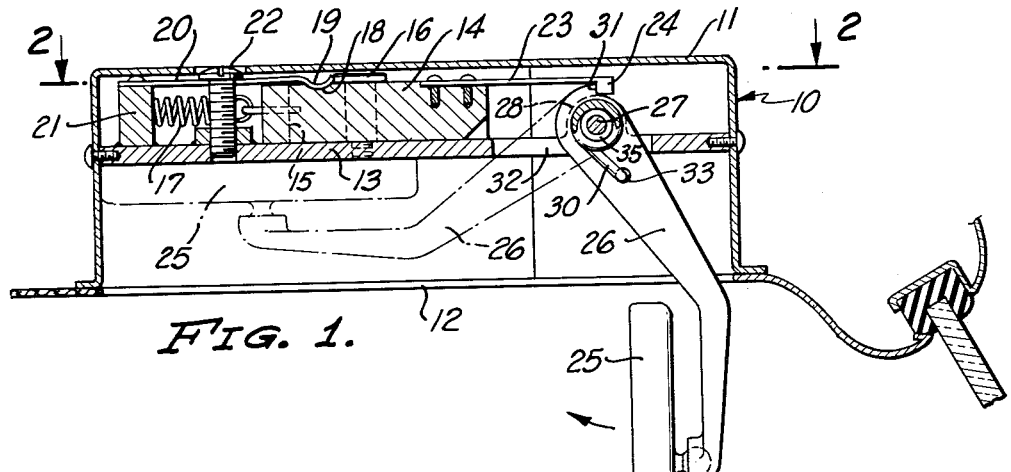
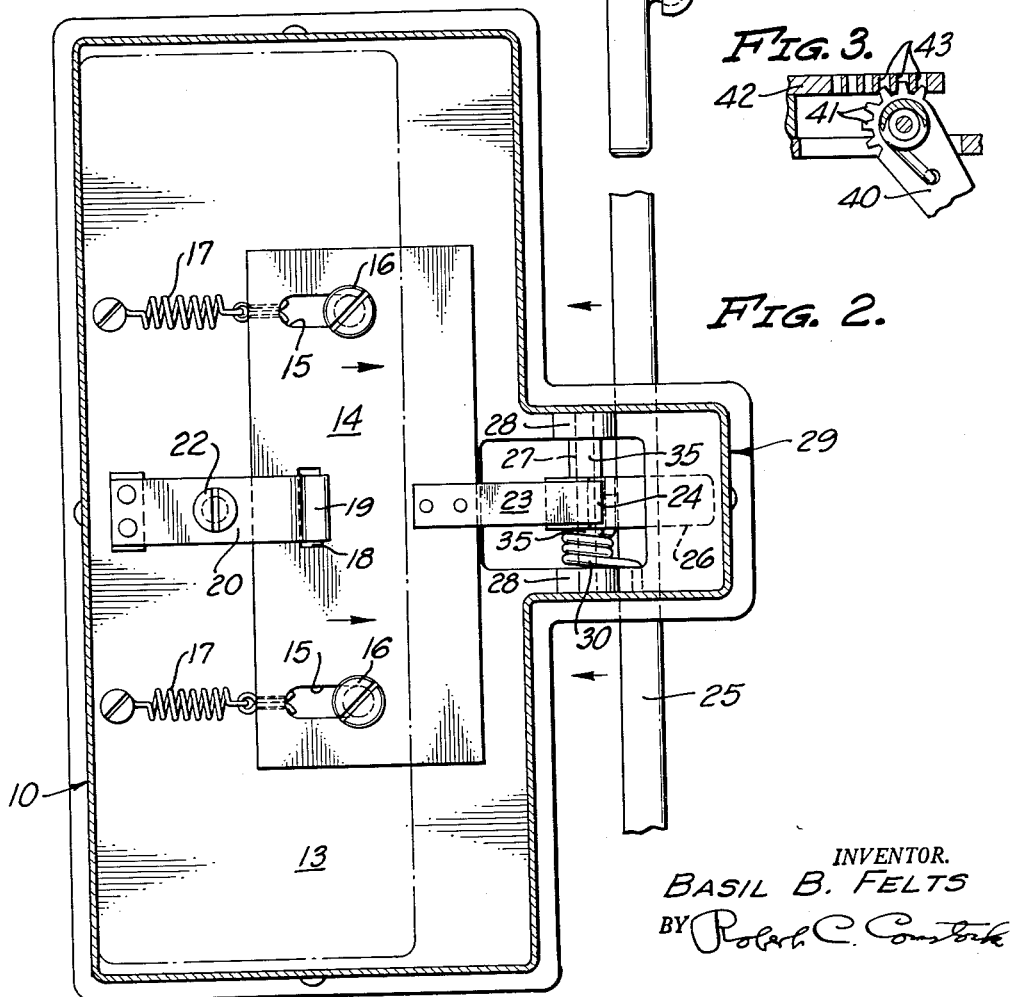
INVENTOR.
BASIL B. FELTS
BY Robert C. Comstock
ATTORNEY

United States Patent Office 3,000,264
Patented Sept. 19, 1961

3,000,264
RETRACTABLE MIRROR FOR AUTOMOTIVE VEHICLES
Basil B. Felts, 54 W. Ramsey St., Banning, Calif.
Filed July 27, 1959, Ser. No. 829,616
6 Claims. (Cl. 88—93)

This invention relates to a retractable rear view mirror structure for automotive vehicles.

It is the primary object of my invention to provide a rear view mirror for the interior of an automotive vehicle which is automatically retracted in the event of an accident or sudden stop of the vehicle in order to avoid injury to the driver or passengers from being thrown against a rigidly mounted mirror.

It is a further object of my invention to provide a mirror structure of the type described in which the mechanism for retracting the mirror does not interfere in any way with the everyday use and adjustment of the mirror.

Another object of my invention is to provide such a device which is capable of being reset and re-used after retraction and which is also adjustable as to the amount of impact which is required in order to cause retraction of the mirror.

It is also among the objects of my invention to provide a mirror structure of the type described which is simple to manufacture and install and which is simple in operation.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings, FIG. 1 is a sectional view of my retractable mirror in use on an automotive vehicle, with the mirror and mounting arm shown in elevation in normal position in solid lines and in retracted position in phantom lines;

FIG. 2 is a top plan view of the same, taken on line 2—2 of FIG. 1;

FIG. 3 is a detailed sectional partial view of an alternative form of mirror operating device.

A preferred embodiment which has been selected to illustrate my invention is adapted to be mounted within the interior of an automotive vehicle directly beneath the roof of the vehicle and behind the upper edge of the windshield. The operating mechanism of my mirror structure is contained within a housing 10, which has a closed top 11 and an open bottom 12. Extending transversely beneath and parallel to the top 11 is a plate 13, upon which the operating mechanism is mounted.

A substantially rectangular heavy weight 14 is disposed above and rests upon the top of the plate 13. The weight 14 should have sufficient mass so that it will continue to move forwardly upon impact of the vehicle striking an object or upon a sudden stop. The weight 14 is provided with a pair of longitudinally directed elongated slots 15, through which extend a pair of screws or other suitable fastening members 16.

A pair of coil springs 17 are secured at their forward ends to the rear edge of the weight 14 and at their rear ends to a pair of screws which are secured to the plate 13. The coil springs 17 exert tension on the weight 14, normally tending to hold it in a retracted position with respect to the plate 13. When the weight 14 is disposed in retracted position, the shanks of the screws 16 are disposed at the forward ends of the slots 15.

The top of the weight 14 is provided with an arcuate recess 18 which is adapted to removably receive the complementarily shaped downwardly directed free forward end 19 of an elongated spring latch 20. The rear end of the spring latch 20 is secured to the top of a stud 21 which is directed upwardly from the plate 13 adjacent the rear edge thereof. An adjusting screw 22 has its shank extending through an opening in the midportion of the spring latch 20. The bottom of the head of the adjusting screw 22 bears against the midportion of the spring latch 20, while the lower end of its shank is screw threaded into the plate 13. The adjusting screw 22 can be tightened or loosened to adjust the amount of force which must be exerted by the weight 14 in order to unseat the forward end 19 of the spring latch 20 from the recess 18 and permit forward movement of the weight 14.

Extending longitudinally forwardly from the center of the front edge of the weight 14 is a tongue 23. The tongue 23 is secured at its rear end to the top of the weight 14. The forward end of the tongue 23 is free and is provided with a downwardly directed catch 24, which holds the mirror in its normal position.

The mirror 25 is substantially rectangular in shape and is adjustably mounted on the lower end of a mounting arm 26 by means of a ball and socket or other suitable adjustable mounting means. The upper end of the mounting arm 26 is secured to a horizontally directed shaft 27, which is rotatably mounted at its opposite ends in a pair of journals 28. The journals 28 are mounted on the opposite inner vertical walls of an extension 29 which extends forwardly from the main portion of the housing 10. A pair of identically formed spacers 35 surround the shaft 27 on opposite sides of the mounting arm 26.

A coil spring 30 is mounted surrounding one of the spacers 35 on one side of the mounting arm 26. One end of the coil spring 30 is disposed beneath and bears against the bottom of the plate 13. The other end of the coil spring 30 extends into an opening 33 in the upper portion of the mounting arm 26 beneath the shaft 27. The coil spring 30 normally tends to urge the mounting arm 26 and mirror 25 into rotation in a clockwise direction.

The extreme upper end of the mounting arm 26 above the shaft 27 is provided with a notch 31 which is adapted to engage the catch 24 of the tongue 23. The engagement between the catch 24 and notch 31 acts to prevent rotation of the mounting arm 26 by the coil spring 30.

In use, the weight 14 is normally disposed in the position shown in the drawings. In such position, the coil springs 17 and spring latch 20 hold the weight 14 in retracted position. If the vehicle strikes an object or stops suddenly, the weight 14 has sufficient momentum so that it tends to continue to move in a forward direction. If the impact is strong enough, the weight 14 will unseat the forward end 19 of the spring latch 20 from the recess 18. The forward movement of the weight 14 moves the tongue 23 forwardly, causing the catch 24 to move out of engagement with the notch 31 in the upper end of the mirror mounting arm 26. The mounting arm 26 and mirror 25 are thus released for clockwise rotation in response to the urging of the coil spring 30.

The mirror 25 and mounting arm 26 will move in a clockwise direction until they are disposed in the position shown in phantom lines in FIG. 1 of the drawings. The mirror 25 is then disposed beneath and directly adjacent to the plate 13 within the housing 10 and the arm 26 is also disposed within the housing 10. The plate 13 is provided with an opening 32 which permits rotation of the mounting arm 26.

As soon as the catch 24 is released from the notch 31, the coil springs 17 retract the weight 14 until the forward end 19 of the spring latch 20 engages the recess 18.

The mirror can be re-set by pivoting the mounting arm 26 in a counter-clockwise direction against the urging of the coil spring 30 until it is returned to its normal position. The tongue 23 is sufficiently resilient so that the catch 24 rides the rounded cam-like surface of the upper part of the mounting arm 26 until it drops into the notch 31 to lock the mirror in its normal position.

Referring to FIG. 3 of the drawings, this figure shows an alternative embodiment of my invention in which the upper end of the mounting arm 40 is provided with a plurality of spaced gear teeth 41. The forward end of the tongue 42 is provided with a plurality of spaced openings 43 which are adapted to receive the gear teeth 41. When the tongue 42 moves forwardly, the openings 43 engage the gear teeth 41 to rotate the mounting arm 40. When the mounting arm 40 is rotated back to its normal position, the gear teeth 41 engage the openings 43 to move the tongue 42 back to its normal position.

In this embodiment of my invention, the coil springs 17 of the first embodiment would be omitted and the weight would be returned to its normal position simultaneously with the mounting arm 40 by the gear engagement between the mounting arm 40 and tongue 42. The weight and mirror in this embodiment of my invention would be held in normal position by a spring latch construction corresponding to the spring latch 20 having a forward end 19 engaged within a recess 18 in the weight 14, as shown and described in the first embodiment of my invention.

I claim:

1. A retractable rear view mirror construction for the interior of an automotive vehicle comprising a mounting arm mounted at one end thereof for rotation beneath the roof of the vehicle adjacent to and behind the top of the windshield, a rear view mirror mounted on the opposite end of said mounting arm, said mounting arm being rotatable between a normal position in which said mirror is held in substantially vertical position and a retracted position in which said mirror is moved to a more horizontal position adjacent to the roof of the vehicle, a weight disposed beneath the roof of the vehicle adjacent to and behind the top of the windshield and adjacent to the upper end of said mounting arm, said weight being mounted for sliding movement along the longitudinal axis of the vehicle, means carried by said weight engaging said mounting arm to hold said mounting arm in said normal position, a coil spring engaging said mounting arm and urging said mounting arm toward said retracted position, retaining means engaging said weight to normally maintain said weight in a retracted position, said weight adapted upon impact of the vehicle against an object to be moved forwardly by the force of inertia against the force of said retaining means, the forward movement of said weight releasing said mounting arm for rotation by said spring to said retracted position.

2. The structure described in claim 1, the means carried by said weight for engaging said mounting arm to hold said mounting arm in normal position comprising a forwardly directed tongue carried by the forward end of said weight, said tongue having a downwardly directed catch at the forward end thereof, said mounting arm having a notch therein, said catch being adapted to engage said notch to prevent the rotation of said mounting arm.

3. A retractable rear view mirror construction for the interior of an automotive vehicle comprising a mounting arm mounted at one end thereof for rotation beneath the roof of the vehicle adjacent to and behind the top of the windshield, a rear view mirror mounted on the opposite end of said mounting arm, said mounting arm being rotatable between a normal position in which said mirror is held in substantially vertical position and a retracted position in which said mirror is moved to a more horizontal position adjacent to the roof of the vehicle, spring means urging said mounting arm toward said retracted position, a weight disposed beneath the roof of the vehicle adjacent to and behind the top of the windshield and adjacent to the upper end of said mounting arm, said weight being mounted for sliding movement along the longitudinal axis of the vehicle, said weight having at least one longitudinal slot, a fastening member having its shank extending through said slot, said slot acting to limit the movement of said weight along the longitudinal axis of the vehicle, coil spring means attached at the forward end thereof to said weight, the rear end of said coil spring means being stationary with respect to the vehicle, said spring means urging said weight toward a retracted position, means carried by said weight engaging said mounting arm to hold said mounting arm in said normal position, said weight adapted upon impact of the vehicle against an object to be moved forwardly by the force of inertia against the urging of said spring means, the forward movement of said weight releasing said mounting arm for rotation thereof to said retracted position.

4. A retractable rear view mirror construction for the interior of an automotive vehicle comprising a mounting arm mounted at its upper end for rotation on an axis disposed adjacent the roof of the vehicle, a rear view mirror mounted on the lower end of said mounting arm, said mounting arm being rotatable between a normal position in which said mirror is held in substantially vertical position and a retracted position in which said mirror is retracted to a more horizontal position adjacent to the roof of the vehicle, spring means urging said mounting arm toward said retracted position, a weight mounted for sliding movement along the longitudinal axis of the vehicle, catch means carried by said weight engaging said mounting arm to hold said mounting arm against rotation toward retracted position, and retaining means normally maintaining said weight in retracted position, said weight adapted upon impact of the vehicle against an object to be moved forwardly by the force of inertia against the force of said retaining means, the forward movement of said weight releasing said mounting arm for rotation to retracted position.

5. A retractable rear view mirror construction for the interior of an automotive vehicle comprising a mounting arm mounted at one end thereof for rotation, a rear view mirror mounted on the other end of said mounting arm, said mounting arm being rotatable between a normal position and a retracted position in which said mirror is retracted to a position adjacent to the roof of the vehicle, means urging said mounting arm toward retracted position, a weight mounted for sliding movement along the longitudinal axis of the vehicle, means carried by said weight holding said mounting arm against rotation toward retracted position, and means normally maintaining said weight in retracted position, said weight adapted upon impact of the vehicle against an object to be moved forwardly by the force of inertia, the forward movement of said weight releasing said mounting arm for rotation to retracted position.

6. The structure described in claim 5 and means for adjustably controlling the amount of impact required to cause the forward movement of said weight, said means including a spring latch mounted adjacent to said weight, said spring latch having a downwardly directed portion, said weight having a downwardly directed recess, said downwardly directed portion of said latch fitting within said recess, and an adjustable member for controlling the amount of tension holding said downwardly directed portion of said latch in said recess.

References Cited in the file of this patent

UNITED STATES PATENTS

| | | |
|---|---|---|
| 742,687 | Livingston | Oct. 27, 1903 |
| 2,060,062 | Fischer | Nov. 10, 1936 |
| 2,796,815 | Kaplan et al. | June 25, 1957 |